United States Patent
Röhner et al.

(10) Patent No.: US 7,438,317 B2
(45) Date of Patent: Oct. 21, 2008

(54) ROLLOVER PROTECTION DEVICE

(75) Inventors: Stephan Röhner, Dortmund (DE); Hartwig Müller, Chemnitz (DE)

(73) Assignee: ISE Innomotive Systems Europe GmbH (DE)

( * ) Notice: Subject to any disclaimer, the term of this patent is extended or adjusted under 35 U.S.C. 154(b) by 85 days.

(21) Appl. No.: 10/548,464

(22) PCT Filed: Feb. 10, 2004

(86) PCT No.: PCT/EP2004/001231

§ 371 (c)(1),
(2), (4) Date: Jun. 27, 2006

(87) PCT Pub. No.: WO2004/078533

PCT Pub. Date: Sep. 16, 2004

(65) Prior Publication Data

US 2007/0035116 A1    Feb. 15, 2007

(30) Foreign Application Priority Data

Mar. 7, 2003 (DE) .......................... 203 03 691 U

(51) Int. Cl.
B60R 21/13 (2006.01)

(52) U.S. Cl. ...................... 280/756; 280/753

(58) Field of Classification Search ............... 280/756, 280/753, 751, 754; 297/216.12; 403/322.1
See application file for complete search history.

(56) References Cited

U.S. PATENT DOCUMENTS

| | | | | |
|---|---|---|---|---|
| 5,626,361 A * | 5/1997 | Heiner | .................. | 280/756 |
| 5,788,402 A * | 8/1998 | Banda et al. | ................ | 280/756 |
| 5,927,803 A * | 7/1999 | Hehl et al. | ............. | 297/216.12 |
| 6,296,278 B1 * | 10/2001 | Zupancic et al. | ............ | 280/756 |
| 6,352,285 B1 * | 3/2002 | Schulte et al. | .............. | 280/756 |
| 6,805,378 B2 * | 10/2004 | Berges et al. | ............... | 280/756 |
| 6,817,628 B2 * | 11/2004 | Hovelmann et al. | ......... | 280/756 |
| 6,902,190 B2 * | 6/2005 | Nass | .......................... | 280/756 |
| 6,988,744 B2 * | 1/2006 | Muller | ...................... | 280/756 |
| 7,175,199 B2 * | 2/2007 | Muller | ...................... | 280/756 |
| 7,198,294 B2 * | 4/2007 | Welch | ........................ | 280/756 |

* cited by examiner

Primary Examiner—Hau V Phan
(74) Attorney, Agent, or Firm—Armstrong Teasdale LLP

(57) ABSTRACT

A rollover protection device includes a cassette housing which guides an extendable rollover bar. The cassette housing includes guidances for the rollover bar. The rollover bar is a single shell or multi-shell form part made of fibre reinforced plastic and has shell edge regions which at least partially extend parallel to the extension direction. The cassette housing is a hollow profile made from high strength material and is closed around the rollover bar and the guidance. The guidance is a plastic form part engaging at a shell edge region, is secured within the hollow profile and protrudes from the hollow profile at least downwards.

14 Claims, 2 Drawing Sheets

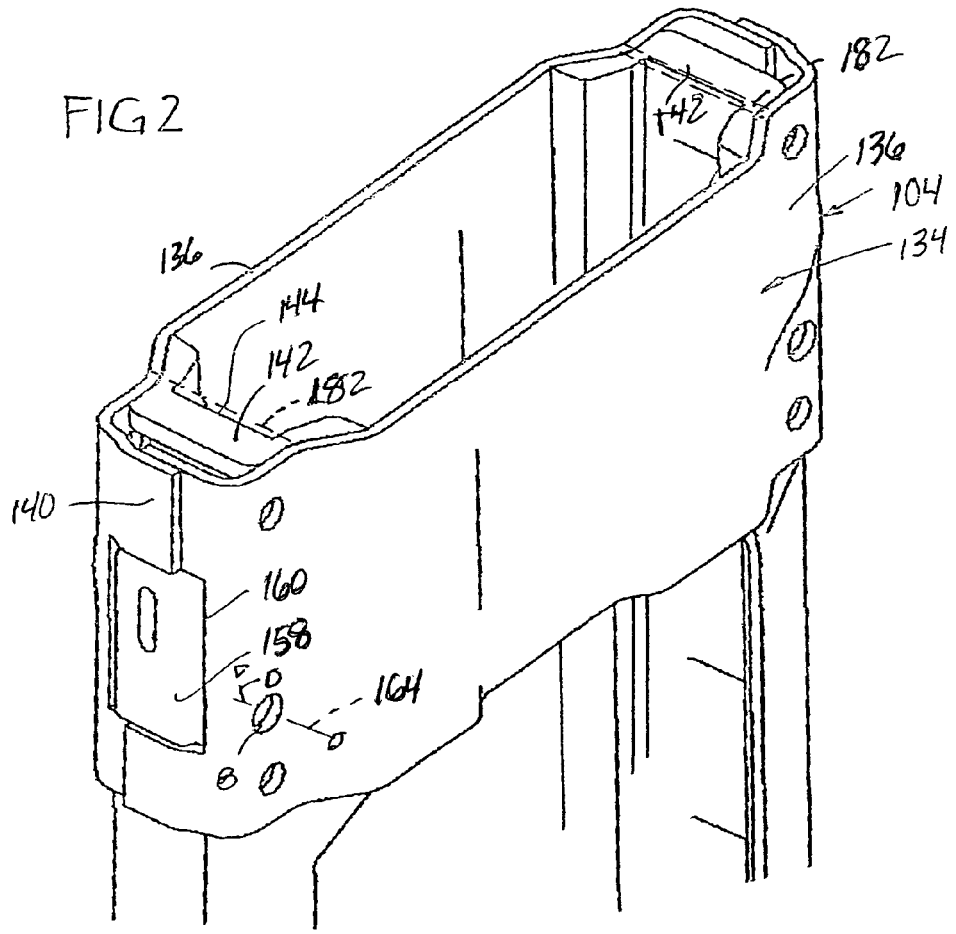
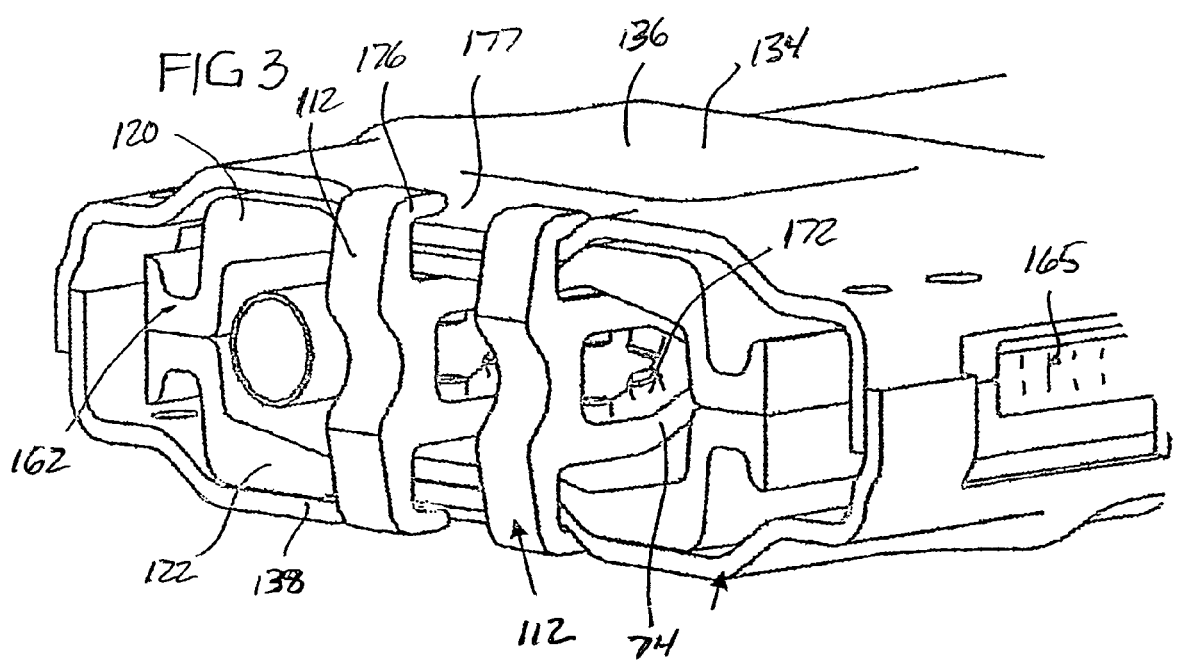

ROLLOVER PROTECTION DEVICE

CROSS REFERENCE TO RELATED APPLICATIONS

This application is a filing under 35 U.S.C. § 371 of PCT/EP04/01231 filed Feb. 10, 2004, the disclosure of which is hereby incorporated by reference in its entirety.

BACKGROUND OF THE INVENTION

The invention relates generally to passenger protection devices for vehicles, and more specifically to a rollover protection device.

DE 43 42 400 A1 discloses one type of rollover protection device including a cassette housing made from aluminum and having side walls which are interconnected via a guiding body formed as an aluminum form part. The cassette housing has a bottom plate which grips around the lower ends of the rollover bar which is formed as a U-shaped tube bracket. The side walls as well are interconnected by a rear wall made from aluminum. The guiding body guides the U-legs of the rollover bar via slide bushings made from plastics. The U-legs of the rollover bar additionally are guided on plastic standpipes extending upwardly from the bottom plate. As a consequence, the cassette housing includes a compound structure of aluminum and plastic. Since the rear wall interconnects the side walls exclusively in the lower part of the cassette housing while the guiding body extends exclusively in the upper part of the cassette housing and between the side walls, the guiding body has to serve as a main load carrying element. The achievable crash performance in this type of device is correlated to the weight of the entire structural unit.

U-shaped cassette housings for receiving U-shaped tubular rollover bars are disclosed in, for example, U.S. Pat. No. 5,626,361 A (DE 43 14 538 A), EP 1 084 914 A, EP 1 038 735 A, and EP 1 028 050 A. These cassette housings are open at one broader side. Relatively small force transmitting areas are formed between the cassette housing having the U-cross-section and one open side and the vehicle body which force transmitting areas will be loaded by locally concentrated stress in a crash case.

A shell construction of rollover bars made from fibre reinforced compound plastic-is disclosed in, for example, DE 20 10 30 01 U. These rollover bars are directly guided between a profiled bulkhead of the vehicle body and a lateral beam made of fibre reinforced compound plastic material.

It would be desirable to provide a rollover protection device having a fair cost structure, extremely low weight and nevertheless an excellent crash performance.

BRIEF DESCRIPTION OF THE INVENTION

In an exemplary embodiment, a vehicle rollover protection device is provided. The device comprises a cassette housing for guiding an extendable rollover bar. The cassette housing included guidances for the rollover bar, and the rollover bar is selectively positionable in a retracted position and an extended position. The rollover bar is a form part made of fibre reinforced compound plastic material in a structure comprising a single shell or several shells, and the rollover bar includes shell edge regions which at least partially extend parallel to a direction of extension of the rollover bar. The cassette housing is a hollow profile made from high strength material and having an upper profile end, a lower profile end, and narrow sides. The profile is open at both of the upper and lower profile ends and is closed around the rollover bar and the guidances. The rollover bar when retracted from the extended position into the hollow profile protrudes from the hollow profile at the upper and lower profile ends. The guidances are plastic form parts which engage at the shell edge regions and are firmly attached inside in the narrow sides of the hollow profile, The guidances protrude at least downwards beyond the lower profile end of the hollow profile.

Due to this mixed construction, the hollow profile made from a high strength material and the plastic form parts for guiding the rollover bar made of fibre reinforced compound plastic material can be pre-assembled for fair costs. Components (e.g., drive means and sensors, locking means and the like) needed for the function of the rollover protection device can be incorporated in the rollover protection device already during the pre-assembly process. High forces can be taken up via large areas and can be transmitted via large areas to a vehicle body, since the stable hollow profile surrounds on all sides the plastic material form parts which contribute during the force transmission in case of a crash, and the rollover bar. The construction results not only in a superior crash performance but also in a low weight of the compact rollover protection device.

The hollow profile expediently includes steel sheet material, in particular high strength steel sheet material. Due to the nature of the material and the hollow profile which is relatively short in relation to the length of the rollover bar, weight is saved significantly. High forces can be taken up and transmitted without problems in several different directions.

Alternatively the hollow profile even may consist of aluminum or magnesium or of high strength alloys of light metals, respectively.

A further alternative which is expedient with a view to saving weight refers to a hollow profile formed of fibre reinforced compound plastic material containing endless fibres in a matrix of plastic.

For manufacturing reasons and assembly reasons it may be expedient to combine the hollow profile of matching profiles or walls. The components can be interconnected by screwing, welding or other connection techniques. Such connections can withstand high forces without problems and even are able to dissipate energy in case of extremely high forces and may yield at least somewhat. A unitary hollow profile made from steel sheet material e.g. is formed by rolling from a section of a tube or a profile.

In some cases the incorporated plastic form parts do not only have the task of guiding the rollover bar and introducing the forces into the hollow profile, but the plastic form parts even can take up forces at their protruding length region even outside of the hollow profile and even can transmit such forces in some cases into the vehicle body. For this reason the plastic form parts should be injection moulded parts which are reinforced by short staple fibres or by longer fibres. Such injection moulded parts can be manufactured for fair cost. As an alternative, plastic pressing parts could be used which are reinforced by endless fibres. The moulding process of such pressing parts allows a great variety of shapes. In such cases thermoplastic or duroplastic plastic materials could be used. Glass e.g. can be used as the fibre material and may also be used in the fibre reinforced compound plastic material of the rollover bar and/or of the cassette profile section, e.g. in the form of prepregs which are available on the market and which are pre-impregnated by plastic material.

In order to allow to the transmission of forces into the vehicle bottom, the free ends of the plastic form parts should be formed with vehicle bottom connection means, either such that the plastic form parts are supported in pressing direction on the vehicle body or even are connected with the vehicle body by a form fit or a force fit, respectively.

In an expedient embodiment, the free ends of the plastic form parts may be interconnected by a lateral strut which may, in some cases, be provided with vehicle bottom connection means.

The lateral strut which also serves for stabilizing purposes may fulfill a secondary function such that it contains components for the actuation of the rollover bar like the actuator and a driving spring or a locking structure for the retracted rollover bar. Within a U-shaped body the lateral strut may be integrally connected with the form parts. Alternatively, the lateral strut can be manufactured separately (from the same or another material, e.g. light metal) and can be inserted later (by screwing, gluing, latching or the like).

In order to transmit occurring forces in the case of a crash via areas which are as large as possible and in a reliable fashion, a form fit ought to be provided between the plastic parts and the hollow profile, preferably by means of screws or bolts which as well penetrate the hollow profile. The screws or bolts can be inserted into force distributing sleeves within the respective plastic form part or could be inserted into at least one block which is formed in the plastic form part. The block may fit into a suitably formed cut-out of the hollow profile. The form fit also facilitates the pre-assembly of the rollover protection device.

A pawl supporting bolt may be held in at least one plastic form part. The pawl supporting bolt carries a pawl which supports and locks the extended rollover bar and further transmits the force acting on the pawl. Preferably, the pawl supporting bolt also penetrates the hollow profile.

In order to dissipate energy in case of a crash between the rollover bar and the vehicle body, a predetermined deformation region could be provided in the plastic form part and/or in the hollow profile. The predetermined deformation area is deformed by the pawl supporting bolt for dissipating energy during the transmission of forces. Such a predetermined deformation area e.g. could be an intentionally formed material weakening in the plastic form part and/or deformable or breakable through openings in the hollow profile which allow a predetermined dislocating movement of the pawl supporting bolt under load.

In order to assure that in case of a crash the rollover bar contacts the ground as early as possible and also with favourable lever arms in relation to the fixation location of the hollow profile in the vehicle body, the rollover bar may have a head structure which is thickened on all sides, in some cases even with broadened shoulders in the upper end region. This prevents a too easy intrusion of the rollover bar into soft ground. Furthermore, a desired abrasion property can be preset in this case for the ground contacting portions of the rollover bar.

At least one anchor within the rollover bar may be provided to define the extended end position of the rollover bar. The anchor even may grip around the edges on both sides of the hollow profile in order to prevent an undesirable expansion of the hollow profile due to reaction forces.

Furthermore, at least one local energy absorbing area could be provided in the rollover bar in order to intentionally abolish energy.

Further energy abolishment can be achieved by at least one cover on the hollow profile which cover digs into the edge region of the rollover bar during the unavoidable setting movement of the rollover bar during a rollover crash. The cover should, preferably, have a cutting edge which either removes material of the rollover bar or deforms under load. This effect can be enhanced by a mating nick in the edge region of the rollover bar.

BRIEF DESCRIPTION OF THE DRAWINGS

FIG. 2 is a perspective view of the devise shown in FIG. 1 without the rollover bar.

FIG. 3 is a perspective end view without rollover bar guidances.

DETAILED DESCRIPTION OF THE INVENTION

Figure 1:
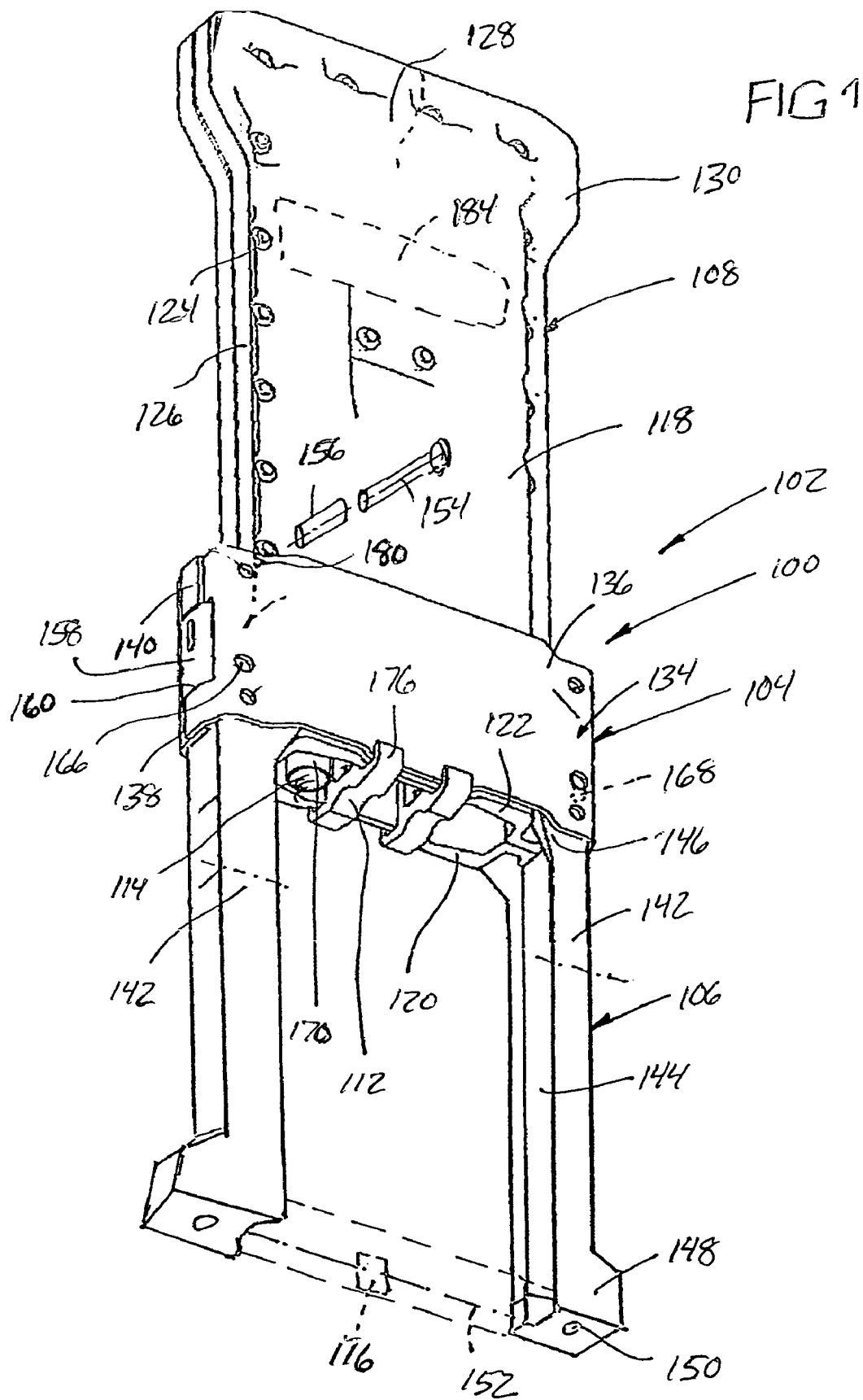
FIG. 1 is a perspective view of an exemplary pre-assembled rollover protection device with an extended rollover bar.

Referring now to the Figures, a rollover protection device 100 can be installed as a structural unit 102 into a vehicle body (not shown). In different embodiments, the structural unit 102 either is mounted in a shaft between lateral bulkheads of the vehicle body or directly at a vehicle body lateral bulkhead or at a lateral beam. The rollover protection device 100 has the task of protecting passengers in case of a rollover accident of the vehicle and is, for this reason, mainly used for convertibles.

The rollover protection device 100 is installed behind a seat rest (not shown), and, in particular, either behind each front seat or behind each rear seat.

Main components of the rollover protective device 100 include a cassette housing 104 and guidances 106 for the rollover bar 108. The rollover bar 108 is displaceably guided by the cassette housing 104 between a retracted position and the extended rollover position shown in FIG. 1. A lock 110 is integrated into the cassette housing 104 for locking the rollover bar 108 in the rollover position. Anchors 112 mounted in the rollover bar 108 serve to limit the extension of the rollover bar 108 in the rollover position. Furthermore, an extension drive 114 is provided, e.g. at least one preloaded compression spring, which can be activated by an actuator 116 a soon as an integrated sensor (not shown) releases a latch which defines the retracted position.

In an exemplary embodiment, the rollover bar 108 is formed in shell construction of fibre reinforced compound plastic material. The rollover bar 108 may include a single shell or a plurality of shells, e.g. as shown, two shells. That is, the rollover bar 108 has a shell body 118 which in this case consists of two shells 120, 122 which are attached to each other by fixation elements 124. The rollover bar 108 has substantially linear edge regions 126 at which the guidances 106 engage. The rollover bar 108 may comprise a thickened head structure 128 and/or shoulders 130 protruding outwardly beyond the edge regions 126 in order to positively influence the abrasion property and/or the ground digging property of the rollover bar 108 in case of a crash.

The cassette housing 104 includes a hollow profile 134 which is open at both ends and which surrounds the rollover bar 108 and the guidances 106 on all sides. The hollow profile 134 consists of an e.g. high strength material in one embodiment. In the case shown the hollow profile 134 consists of high strength steel sheet material, and e.g. is made from two profiles 134, 136 which are connected in the region of the edge flanges 140. The connections may include welding, screwing, clinching, riveting or the like. The hollow profile 134 even could be one piece and could be formed by e.g. rolling.

The hollow profile 134, alternatively, could consist of aluminum or magnesium or of high strength alloys of such light metals. As a further alternative, the hollow profile could be made of a fibre reinforced compound plastic material which may be similar or different from the fibre reinforced compound plastic material of in the rollover bar. The height dimension of the hollow profile 134 in the shown embodiment is smaller than the width dimension. The guidances 106 at least are attached with a form fit in the narrow side areas of the hollow profile 134.

Each of the guidances 106 is a plastic material form-part 142 of longitudinal format and has an inner guiding track 144 for one rollover bar edge region 126. The plastic form part 142, furthermore, includes reinforced upper fixation regions 146 and, in some cases, reinforced lower fixation regions 148 including vehicle body bottom connection means 150. In some cases the free ends of the form parts 142 may be interconnected by at least one lateral strut 152. The actuator 116 and/or the vehicle body bottom connection means 150 may be arranged at the lateral strut 152. In case that exclusively the hollow profile 134 is used for transmitting forces into the vehicle body, the guidances 106 could be designed shorter then shown (indicated in dotted lines). Both form parts 142 and the lateral strut 152 could form a one-piece U-shaped structural unit. Alternatively, the lateral strut 152 may be a separate form part, e.g. made form light metal or plastic into which sockets e.g. for the actuator 114 and/or the extension spring are formed. This form part easily can be e.g. latched into openings of the form parts including the guidances 106.

The forms parts 142 may be injection moulded parts made from plastic material which is reinforced with short staple fibres or long fibres, or could be pressing form parts made of fibre reinforced compound plastic material, respectively.

In order to secure each form part 142 with a form fit in the hollow profile 134 e.g. fixation screws or bolts 154 could be provided which penetrate through the hollow profile 134. The fixation screws or bolts 154 e.g. may be equipped with sleeves 156 for distributing forces and/or spacing purposes. The hollow profile 134 has fixation bores. Alternatively and additively, the form part 142 may have an integrated block 158 which is fitted into a cut-out 160 formed in the hollow profile 134.

The lock or locking device 110 may include, preferably at one side of the rollover bar, a pawl 162 which is carried by a pawl supporting bolt 164. The pawl co-acts with a latching cogging 165 indicated in FIG. 3 (e.g. consisting of light metal) in the edge region 126. The pawl supporting bolt 164 may penetrate through supporting openings 166 in the hollow profile 134. Expediently, predetermined deformation areas 168 are provided in the form part 142 and/or in the hollow profile 134. The predetermined deformation areas 168 yield in predetermined fashion under the load on the extended rollover bar 108 in order to dissipate or abolish energy. The predetermined deformation areas 168 may include weakened regions in the form part 142 and/or weakened regions in the hollow profile 134, e.g. keyhole like formed supporting openings as indicated in dotted lines with reference numeral 168.

The spring constituting the extension drive 114 may be guided in a tube 170 provided in the interior of the rollover bar 108. The spring may be supported at the vehicle body bottom and/or the lateral strut 152, respectively.

The anchors 112 limiting the extended rollover position e.g. consist of aluminum and are inserted into one open end of the rollover bar 108. Each anchor 112 is connected at 172 (FIG. 3) with the rollover bar 108. Each anchor 112 (there might be provided a single anchor only) has an edge-shaped insertion part 174 which fits into the inner cross-section of the rollover bar 108 and two outwardly extending hooks 176 which will be caught at the lower edge regions of the section of the hollow profile 134, e.g. in indentations 177 formed at each side. The hooks 176 grip around the edge regions in order to prevent an expansion of the hollow profile 134 in case of occurring reaction forces.

The fibre reinforced compound plastic material of which the rollover bar 108 and/or the form part 142 may consist, preferably contains endless fibres of glass in a matrix of plastic material, e.g. of a thermoplast. These components are processed in a hot pressing process to the desired shape. The endless fibres expediently are contained in prepregs which are available on the market and which are already pre-impregnated with the plastic material. The prepregs are e.g. available as fabrics or fleeces. Other high strength fibres, e.g. carbon fibres, in some case cases may be used alternatively or additively.

The plastic form parts 142 are firmly locked to the stable hollow profile 134 in the rollover protection device 100 in order to introduce the high forces from the rollover bar 108 into the hollow profile 134 in case of a rollover accident. The hollow profile 134 then transfers the forces into the vehicle body. The plastic form parts 142 may contribute to the load transfer due to the design and in some cases via a support at the vehicle body, in particular at a support at the vehicle body bottom, and also may transfer forces, i.e. will behave like a kind of a bendable beam and/or of a compression pillar in order to also transfer forces.

The hollow profile 134 can be formed of profiles or from a U-profile and an essentially planar covering plate. In some cases the hollow profile 134 even can be a unitary structure.

In a simple embodiment the hollow profile 134 defines a rectangular box in the shown embodiment. The narrow side regions of the hollow profile 134 are drawn in relative to the middle section of the hollow profile along the entire height and in the regions in which the plastic form parts 142 are attached by form fit such that the inner width is larger in the middle region than in the narrow side regions.

The rollover protection device 100 includes the structural unit 102 which can be pre-assembled and pre-tested. The structural unit 102 is of compact size, is very light and has a superior rollover crash performance. The crash performance assures that all loads occurring in case of a crash are reliably introduced in many different directions into the vehicle body. The broadened shoulders 130 or the head structure 128 of the rollover bar 108 come into contact with the ground very early. Furthermore, the broadened region in the upper end region of the rollover bar (the head structure 128) prevents that the rollover bar digs too easily into soft ground. In this regions, in some cases, a wear resistant zone can be formed by an increased mass concentration and/or with the help of wear inserts. These measures as well contribute to the good crash performance.

As any energy dissipation already between the rollover bar 108 and the vehicle body means a positive contribution to the crash performance in the case of a rollover accident, even further measures for dissipating energy may be expedient.

In FIGS. 1, 2 a nick 180 is indicated in dotted lines in one edge region 126 of the rollover bar 108. In the extended position of the rollover bar 108 the nick 180 is located close to a sharp edge of a cover 182 which is provided sidewardly at the hollow profile 134. In case of an introduced load, the rollover bar tends to set or tilt sidewardly in relation to the hollow profile 134, in particular in a case in which at one side only a pawl support is provided. In this case the cover 182 will dig into the edge region 126 in order to peel off material during the unavoidable setting motion of the rollover bar 108 such that energy is dissipated. The nick 180 could even be dispensed with for this effect if the cover 182 has enough stability and/or has a very sharp edge.

A further measure to dissipate energy is provided by at least one locally provided energy absorption area 184 which responds in case of a crash such that energy is significantly dissipated. The energy absorption area 184 can easily be formed in the rollover bar 108 consisting of fibre reinforced compound plastic material, because this material allows an extremely large degree of freedom for shaping the rollover bar 108.

The latter measure can be incorporated into the rollover bar 108 by a special design and/or a variation of the wall thickness and/or a variation of the fibre content and the like.

While the invention has been described in terms of various specific embodiments, those skilled in the art will recognize that the invention can be practiced with modification within the spirit and scope of the claims.

The invention claimed is:

1. A rollover protection device comprising:
    an extendable rollover bar;
    a hollow cassette housing configured receive the rollover bar and configured to guide the extendable rollover for extension in a linear direction relative to the cassette housing, and
    guidances for the rollover bar in the cassette housing;
    wherein the rollover bar is a fibre reinforced compound plastic material formed in a structure comprising at least one shell including a shell edge region, the shell edge region at least partly extending parallel to a direction of the extension of the rollover bar, the shell edge being guided in the cassette housing;
    wherein the cassette housing comprises a hollow profile made from high strength material, the cassette housing having an upper end and a lower end, the cassette housing being open at the upper and lower ends and circumferentially completely surrounding the rollover bar and the guidances;
    wherein the rollover bar protrudes beyond the lower hollow profile end when retracted from an extended position into the hollow profile;
    wherein the guidances are fibre reinforced plastic parts, the guidances engaging the shell edge region and being firmly locked to the hollow profile by a form-fit inside narrow sides of the hollow profile and protrude with free ends at least beyond the lower hollow profile end;
    wherein at least one guidance is provided with a pawl supporting bolt for a locking pawl co-acting with a latching cogging in the shell side edge region, and wherein the pawl supporting bolt additionally is supported in the hollow profile.

2. The rollover protection device of claim 1, wherein the hollow profile is made from one of a steel sheet material or a high strength steel sheet material.

3. The rollover protection device of claim 1, wherein the hollow profile is made from fibre reinforced compound plastic material containing endless fibres in a matrix of plastic material.

4. The rollover protection device of claim 1, wherein the hollow profile is a one-piece structure.

5. The rollover protection device of claim 1, wherein the fibre reinforced plastic parts either are reinforced with one of short staple fibres and long fibres.

6. The rollover protection device of claim 1, wherein the fibre reinforced plastic parts are reinforced with endless fibres.

7. The rollover protection device of claim 1, wherein the free ends of the guidances are attachable to a vehicle body bottom.

8. The rollover protection device of claim 7 wherein the free ends of the guidances are interconnected by at least one lateral strut, wherein the lateral strut is adapted for attachment to the vehicle body bottom, and wherein the lateral strut either is unitarily formed with the guidances or is separately provided from the guidances and inserted between the guidances with one of a form fit and a force fit.

9. The rollover protection device of claim 1, wherein the form-fit comprises fasteners penetrating force distributing sleeves inserted into the hollow profile, or at least one block formed at the guidance and engaging into a cutout of the hollow profile.

10. The rollover protection device of claim 1, wherein at least one guidance is provided with a pawl supporting bolt, and wherein one of the guidances and the hollow profile include a predetermined deformation area provided for the pawl supporting bolt.

11. The rollover protection device of claim 1, wherein the rollover bar comprises an upper end, and a thickened head structure at the upper end.

12. The rollover protection device of claim 11, wherein the thickened head structure has outwardly broadened shoulders protruding relative to the shell edge regions.

13. The rollover protection device of claim 1, wherein at least one anchor is attached to a lower end of the rollover bar, wherein the anchor has hook stops grippingly engaging edges of a lower end of the hollow profile when the extended rollover bar has been caught by the anchor, the hook stops gripping behind the edges and preventing expansion of the hollow profile due to reaction forces in the hollow profile.

14. A rollover protection device comprising:
    an extendable rollover bar;
    a hollow cassette housing configured receive the rollover bar and configured to guide the extendable rollover for extension in a linear direction relative to the cassette housing, and
    guidances for the rollover bar in the cassette housing;
    wherein the rollover bar is a fibre reinforced compound plastic material formed in a structure comprising at least one shell including a shell edge region, the shell edge region at least partly extending parallel to a direction of the extension of the rollover bar, the shell edge being guided in the cassette housing;
    wherein the cassette housing comprises a hollow profile made from high strength material, the cassette housing having an upper end and a lower end, the cassette housing being open at the upper and lower ends and circumferentially completely surrounding the rollover bar and the guidances;
    wherein the rollover bar protrudes beyond the lower hollow profile end when retracted from an extended position into the hollow profile;
    wherein the guidances are fibre reinforced plastic parts, the guidances engaging the shell edge region and being firmly locked to the hollow profile by a form-fit inside narrow sides of the hollow profile and protrude with free ends at least beyond the lower hollow profile end;
    wherein at least one anchor is attached to a lower end of the rollover bar, wherein the anchor has hook stops grippingly engaging edges of a lower end of the hollow profile when the extended rollover bar has been caught by the anchor, the hook stops gripping behind the edges and preventing expansion of the hollow profile due to reaction forces in the hollow profile.

\* \* \* \* \*